(12) United States Patent
Harkcom et al.

(10) Patent No.: US 7,988,380 B2
(45) Date of Patent: Aug. 2, 2011

(54) SEAL HUB FOR PROTECTION OF SEAL AND BEARING FROM METAL FRAGMENTS DUE TO SHEARING OF A SHOCK DEVICE

(75) Inventors: Melanie W. Harkcom, New Holland, PA (US); David M. DeChristopher, Akron, PA (US)

(73) Assignee: CNH America LLC, New Holland, PA (US)

( * ) Notice: Subject to any disclaimer, the term of this patent is extended or adjusted under 35 U.S.C. 154(b) by 476 days.

(21) Appl. No.: 12/125,245

(22) Filed: May 22, 2008

(65) Prior Publication Data
US 2009/0087257 A1    Apr. 2, 2009

Related U.S. Application Data

(60) Provisional application No. 60/975,951, filed on Sep. 28, 2007.

(51) Int. Cl.
*A01D 34/00* (2006.01)
(52) U.S. Cl. ............... 403/365; 56/17.5; 384/477
(58) Field of Classification Search ............ 403/359.1, 403/365; 56/17.5; 384/477
See application file for complete search history.

(56) References Cited

U.S. PATENT DOCUMENTS

| | | | |
|---|---|---|---|
| 4,411,635 A | 10/1983 | Boothroyd et al. | |
| 4,947,972 A | 8/1990 | Lea | |
| 5,481,857 A * | 1/1996 | Umemoto et al. | 56/12.6 |
| 5,483,790 A * | 1/1996 | Kuhn et al. | 56/17.5 |
| 5,651,296 A | 7/1997 | Halm et al. | |
| 5,715,662 A | 2/1998 | Walters | |
| 5,782,073 A * | 7/1998 | Sheldon | 56/17.5 |
| 5,884,463 A * | 3/1999 | Darzinskis | 56/13.4 |
| 6,604,347 B2 | 8/2003 | Preipke et al. | |
| 6,675,563 B1 | 1/2004 | Ehrhart et al. | |
| 6,718,745 B1 | 4/2004 | Adams | |
| 6,939,073 B1 | 9/2005 | Ahmed et al. | |
| 7,201,529 B2 | 4/2007 | Lejeune | |
| 7,392,643 B2 * | 7/2008 | Warashina et al. | 56/17.5 |

* cited by examiner

*Primary Examiner* — Michael P Ferguson
(74) *Attorney, Agent, or Firm* — Patrick M. Sheldrake; Michael G. Harms

(57) ABSTRACT

A seal device for preventing entry of debris into a rotary cutter drive housing when a shock protection device having frangible drive features is removed after having fractured the drive features following a driveline overload condition. The housing includes an upwardly facing opening through which a drive shaft for the cutter extends. The drive shaft rotationally engages the shock protection device for driving the rotary cutter. The seal device is disposed in the upwardly facing opening beneath the protection device and includes drive means for rotation in unison with the drive shaft. The seal device further includes a seal interface for sealing interface with a contact seal disposed on the inner circumference of the opening thereby preventing the entry of debris into the housing.

9 Claims, 2 Drawing Sheets

SEAL HUB FOR PROTECTION OF SEAL AND BEARING FROM METAL FRAGMENTS DUE TO SHEARING OF A SHOCK DEVICE

CROSS-REFERENCE TO RELATED APPLICATIONS

This application claims the benefit of priority of U.S. Provisional Application 60/975,951, filed Sep. 28, 2007.

BACKGROUND OF THE INVENTION

The present invention relates generally to mechanisms for protecting mechanical drive components from overloads, and more particularly relates to a seal hub for use with a shear device coupled between components of an agricultural disc mower that protects the various components of the mower in the event a cutterhead strikes an object and creates an overload condition in the driveline.

Typical disc cutterbars used in agriculture include an elongated housing containing a train of meshed idler and drive spur gears, or a main power shaft or series of power shafts coupled by respective bevel gear sets, for delivering power to respective drive shafts for cutterheads spaced along the length of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. In either case, as would be expected, bearings are used to support the various shafts. The cutterheads are rotated at a relatively fast speed making the drive components, such as gears, bearings, and shafts vulnerable to damage in the event that the unit strikes a foreign object. For background information on the structure and operation of some typical disc cutterbars, reference is made to U.S. Pat. No. 4,815,262, issued to Koch, the descriptive portions thereof being incorporated herein in full by reference.

In order to minimize the extent of such possible damage to the drive components, it is known to incorporate a shear device somewhere in the drive of each unit which will "fail" upon a predetermined overload being imposed on the device. As used herein with reference to shear devices, the terms "fail" or "failing" are intended to cover the actual function of such devices, i.e., shearing, fracturing, breaking and the like.

One known type of shear mechanism employs shearable splines engaged on a splined shaft. The shear device is in the form of either a collar or clamping member having internal frangible splines received on a splined end of the drive shaft. An overload situation preferably causes the frangible splines in the shear device to shear and the continuing transfer of rotational power to cease. Following an overload situation, fragments from frangible splines may be dispersed in the cavity surround the splined shaft and shear device. As the shear device is typically positioned in close proximity to disc cutter bearings and drive gears, the potential for introducing metallic fragments into the disc cutter drive and sealing components is great.

It would be advantageous to have a sealing device for use with a frangible element driveline shock protection device to reduce or eliminate the potential for contamination by metallic fragments that overcomes the above problems and limitations. Further advantages would be realized by a seal device that would allow replacement of the fractured shock protection device without risking entry of fragments into the disc cutter drive.

SUMMARY OF THE INVENTION

Accordingly, it is an object of the present invention to provide a seal device for use with a frangible element driveline shock protection device that prevents entry of metallic fragments into the driveline bearings and gears.

It is a further object of the present invention to provide a seal device that can be easily incorporated into the driveline of a rotary cutter head without significant alteration of the cutter head.

It is a further object of the present invention to provide a seal device for use with a frangible element driveline shock protection device that remains in position as the shock protection device is replaced to further reduce the risk of metal fragment entry into the driveline housing as the shock protection device is replaced.

It is a still further object of the present invention to provide seal device for a rotary cutter head drivetrain that allows metal fragments from a frangible shock protection device to be easily removed without risk of entry into the driveline gear and bearing housing area.

It is a still further object of the present invention to provide a seal device for a rotary cutter head driveline that is durable in construction, inexpensive of manufacture, carefree of maintenance, easily assembled, and simple and effective to use.

These and other objects are achieved in accordance with the instant invention by providing a seal device for preventing entry of debris into a rotary cutter drive housing when a shock protection device having frangible drive features is removed after having fractured the drive features following a driveline overload condition. The housing includes an upwardly facing opening through which a drive shaft for the cutter extends. The drive shaft rotationally engages the shock protection device for driving the rotary cutter. The seal device is disposed in the upwardly facing opening beneath the protection device and includes drive means for rotation in unison with the drive shaft. The seal device further includes a seal interface for sealing interface with a contact seal disposed on the inner circumference of the opening thereby preventing the entry of debris into the housing.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
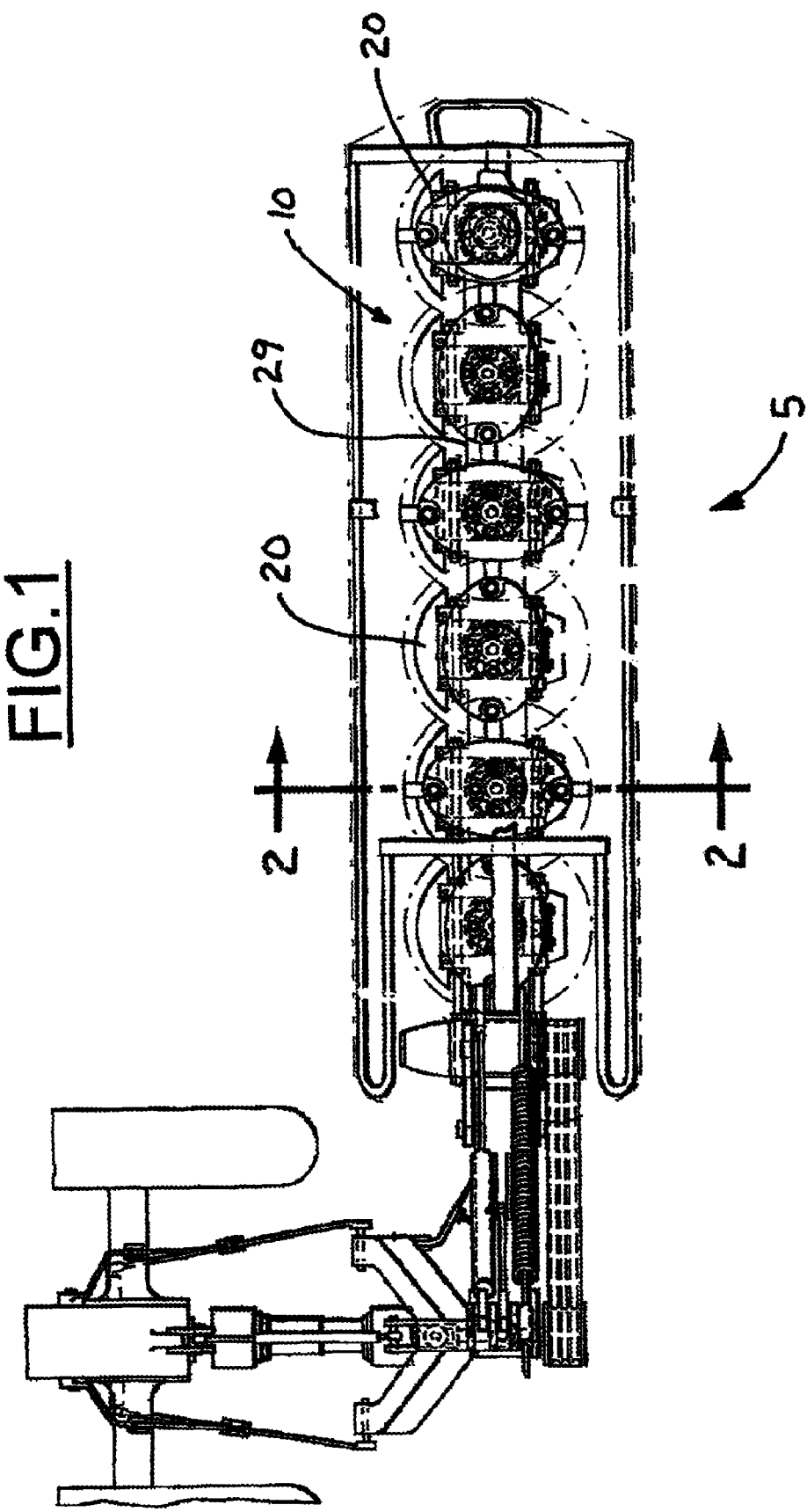
FIG. 1 is a top plan view of a disc mower mounted on the three-point hitch of a tractor, the disc mower having a modular disc cutterbar featuring a plurality of disc cutterhead modules, each module incorporating the principles of the instant invention.

Referring now to the drawings and particularly to FIG. 1, a plan view of a typical modular rotary disc mower 5 having a cutterbar 10 featuring a plurality of individual disc cutterhead modules 20, each module incorporating the principles of the present invention is presented. Cutterbars of this type are used on hitch-mounted, pull-behind, and self-propelled mowers and are generally well-known in the art. For background information on the structure and operation of an exemplar rotary disc cutterbar, reference is made to U.S. Pat. No. 4,815,262, issued to Koch, the descriptive portions thereof being incorporated herein in full by reference.

Figure 2:
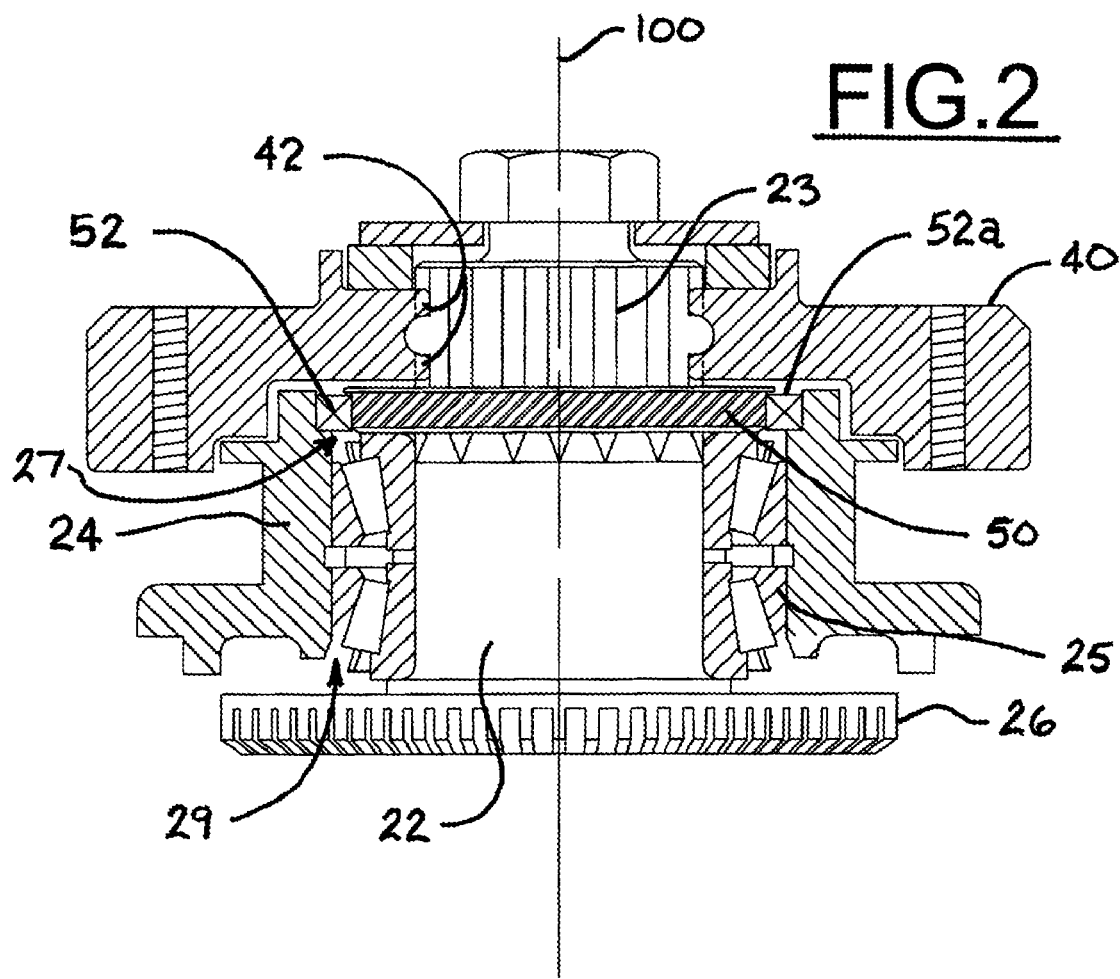
FIG. 2 is a cross-sectional view of a single cutterhead module taken along line 2-2 of FIG. 1 showing the interface between the splined shaft, frangible shock hub, and sealing hub of the present invention.
Figure 3:
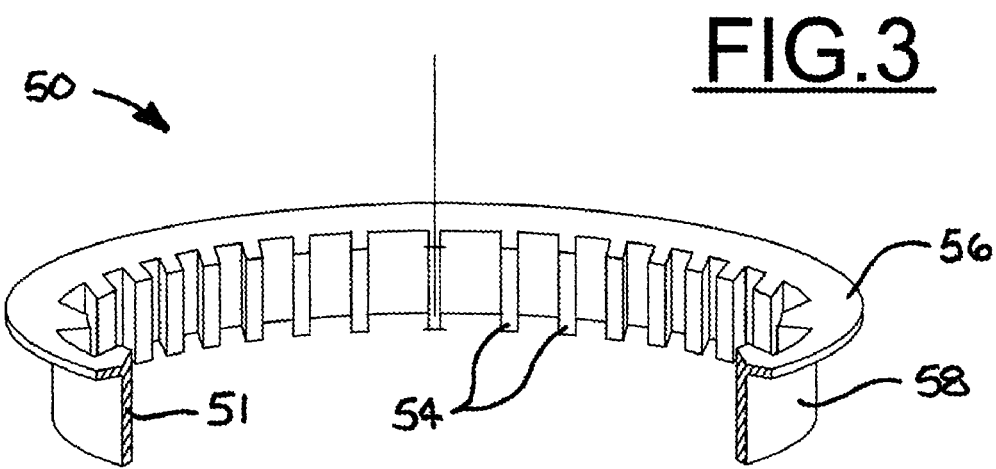
FIG. 3 is a partial perspective view of the seal hub showing the seal face and seal flange.

Now referring to FIGS. 2 and 3, each cutterhead module 20 includes a housing structure 24, a generally vertically oriented drive shaft 22, also referred to as a drive member, interconnecting the driveline for driving the individual rotating head, also referred to as the driven member, to which are connected the cutter blades of each module. The drive shaft 22 is positioned along a rotational centerline 100 which serves as the principal reference axis for the module 20, shock hub 40, and seal hub 50. Drive shaft 22 extends through opening 29 in the housing 24. Opening 29 provides access to the interior portions of the housing 24 for maintenance activities, such as replacement of bearing 25. Thus, opening 29 is generally larger in diameter than drive shaft 22 which creates an annular opening 27 between the drive shaft 22 and the housing opening 29.

Drive shaft 22 features external splines 23 for engagement with frangible splines 42 on shock hub 40. Rotary cutting blades are connected to hub 40 for rotation therewith. The shock hub protects the remaining driveline components by providing a weak link in the driveline in the form of the frangible splines 42 to prevent an overload torque condition in the driven member from being transferred to the drive member. These frangible splines shear from the hub when torque in the driveline exceeds a pre-determined threshold, such as commonly occurs when a cutter blade strikes an object such as a rock. The shock hub 40 provides an easily replaceable apparatus in the driveline to prevent shock impact loads caused when the cutter blades impact a rock or other object from damaging the cutterbar driveline or other portions of the power transfer apparatus.

Establishing a breakaway torque for the shock protection hub 40 that is lower than the torque at which damage to the drive shaft external splines 23 or other portions of the driveline occurs is a well known method for protecting drivelines from momentary torque increases (shock or impact) commonly occurring as a cutter blade strikes an object such as a rock. Known designs typically incorporate a smooth sealing face directly on the shock protection device to fill the annular space 27 between the drive shaft 22 and the inner surface of housing 24, which typically includes a contact seal 52, thereby preventing entry of debris into the housing. However, when a fractured shock protection device is removed for replacement, the barrier is breached when the device with its integral sealing face is removed from the housing thereby opening the drive housing internals area and increasing the potential for fragments of the device to enter the housing.

The solution of the present invention is to provide a sealing hub 50 that is separate from the shock protection device 40. The sealing hub 50 remains in a position covering the annular opening 27 between the drive shaft 22 and the housing 24 (or the contact seal 52) into housing as a failed shock protection device is removed from a disc cutterhead module. The sealing hub 50 features a generally cylindrical base structure 51 having an inner circumference 51a supporting a plurality of internal splines 54 for engagement with the external splines 23 of the driveshaft 22 end which causes the sealing hub 50 to rotate at the same speed as the shaft 22 and shock protection device 40. Thus there is no relative rotational movement between these elements. In a typical splined interface, the gaps between the internal and external splines are sufficiently small to preclude entry of a majority of external contaminants, such as fragments from the frangible splines of the shock protection device 40.

Sealing hub 50 also incorporates a sealing face 58 on the outer radial periphery of the base structure 51 which sealingly interacts with an inwardly facing portion of the housing 24 and the contact seal 52 to prevent contamination from entering the driveline region during normal cutterhead operation. Alternatively, contact seal 52 may be affixed on sealing face 58 for rotation with sealing hub 50 and the sealing interface with the stationary housing occurs on the outer periphery of the contact seal 52. A sealing flange 56 oriented generally perpendicularly to the sealing face 58 extends radially beyond the sealing face 58 to cover all or a portion of the upwardly facing side 52a of the contact seal to further isolate metallic fines from the sealing face 58 of the hub and the contact seal 52. The sealing flange 56 should extend to a radial position at least covering the sliding interface between the rotating and stationary elements of contact seal 52.

Following an overload condition which fractures the frangible splines, the metallic fragments and fines will fall to the top of the sealing hub 50 where they can be cleaned off when the shock protection device 40 is removed. The position of the seal hub over the opening into the driveline region of the cutterhead module avoids exposing the contact seal(s), bearings, and drive gears to the metallic contamination and thereby avoids compromising the service life of the contact seal and/or driveline components.

While the above description is directed to an upwardly facing housing opening 27, those skilled in the art will recognize that the present invention is equally beneficial for sealing a housing opening oriented such that debris from a frangible element protective device could inadvertently enter the housing during replacement of the protective device. Accordingly, reference to "upwardly" includes drive housing openings regardless of orientation when a sealing barrier for preventing inadvertent entry of frangible element debris from a shock protection device is required.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be

Having thus described the invention, what is claimed is:

1. A sealing assembly comprising:
a drive housing having an interior and an exterior portion with a generally circular opening extending therebetween;
a drive member projecting along a rotational axis through the opening, drive member having a torque transfer structure for rotational connection to an overload protection device, the torque transfer structure causing the protection device to rotate in unison with the drive member thereby conveying rotational power to a driven member rotationally connected to the protection device;
a sealing hub having an elongate, hollow, cylindrical base having an inner circumference concentrically mounted on the drive member torque transferring structure for rotation therewith, said base having a seal interface disposed on an outer circumference, and a flange extending radially from one end of said base to a position adjacent to the second surface thereby covering the circular opening and protecting the interior portion of the housing from debris; and
a contact seal being seated within an annular shoulder at an end of the circular opening adjacent the exterior portion of the housing, and the shoulder having a larger diameter than the circular opening to define a first surface of the housing generally parallel to the rotation axis and a second surface of the housing generally perpendicular to the first surface: and the contact seal being sealingly disposed radially between the seal interface of the sealing hub base and the first surface of the housing, and sealingly disposed axially between the second surface of the housing and the sealing hub flange.

2. The hub of claim 1, wherein said torque transfer structure comprises an external spline on said drive member and an interfacing internal spline on said inner circumference.

3. The hub of claim 1, wherein said contact seal is fixed relative to the housing.

4. The hub of claim 1, wherein said contact seal is fixed relative to said sealing hub for rotation therewith.

5. The sealing assembly of claim 1, wherein the circular opening includes a bearing assembly within the interior of the housing located adjacent a side of the sealing hub facing the second surface of the housing, the sealing hub substantially preventing debris from reaching the bearing assembly from an opposing second side of the sealing hub.

6. A seal assembly for a rotary cutter comprising:
a housing enclosing a drive train, the drive train terminating in a drive shaft extending through a generally circular opening in the housing, the drive shaft having a splined end, a shear hub for transferring rotational power from the drive shaft to a cutting head, the shear hub having a plurality of frangible splines for preventing an overload torque in the cutting head from being transferred to the drive train;
a seal hub comprising an elongate cylindrical base structure having an inner perimeter surface, a generally opposing outer sealing surface, and a central axis of rotation, and a plurality of internal splines disposed about said inner perimeter surface interfacing with the splined end of the drive shaft for rotation therewith; and
a seal hub flange connected to one end of said cylindrical base and extending outwardly radially from said outer sealing surface thereby covering the opening and and preventing the entry of debris into the housing; and
a contact seal seated within a shoulder at an end of the circular opening adjacent an exterior portion of the housing, and the shoulder having a larger diameter than the circular opening to define a first surface of the housing generally parallel to the rotation axis and a second surface of the housing generally perpendicular to the first surface and the contact seal being sealingly disposed radially between the outer sealing surface of the seal hub base and the first surface of the housing, and sealingly disposed axially between the second surface of the housing and the seal hub flange.

7. In a mechanically torque transferring mechanism including a partially frangible overload protection device disposed between a drive member and a driven member, the drive member having an outer diameter, a housing with a generally circular opening through which an end of the drive member extends along a central axis of rotation, the overload protection device situated on the drive member above the housing and aligned on the axis of rotation, a seal hub is disposed between an exterior portion of the housing and the overload protection device;
an improvement in the seal hub comprising:
the circular opening of the housing having an annular receptacle at an end of the opening adjacent an exterior portion of the housing, and the receptacle having a larger diameter than the circular opening to define a first surface of the housing generally parallel to the axis of rotation and a second surface of the housing generally perpendicular to the first surface;
an elongate, hollow, cylindrical base having an inner circumference for concentric mounting on the drive member for rotation therewith, said base having a seal interface disposed on an outer circumference of the base, the seal interface for sealing contact with the first surface of the receptacle; and
a flange extending radially from one end of said base to a position adjacent to the second surface of the receptacle thereby covering the circular opening and protecting an interior portion of the housing from debris; and
a contact seal being seated within the annular receptacle and the contact seal being sealingly disposed radially between the seal hub base and the first surface of the housing and sealingly disposed axially between the second surface of the housing and the seal hub flange.

8. The improvement of claim 7, further comprising a plurality of external splines on said drive member and a plurality of internal splines on said inner circumference of said base for intermeshing with said external splines, wherein the number of external splines equals the number of internal splines.

9. The improvement of claim 8, wherein said seal hub is separable from the overload protection device and remains in a position covering the circular opening irrespective of the presence of the overload protection device on the drive member thereby preventing entry of loose frangible parts into the housing when replacing a fractured overload protection device.

* * * * *